Nov. 27, 1928.　　　　　　　　　E. T. BROWN　　　　　　　　　1,692,813
MANUFACTURE OF GLASS
Filed Feb. 16, 1920　　　5 Sheets-Sheet 3
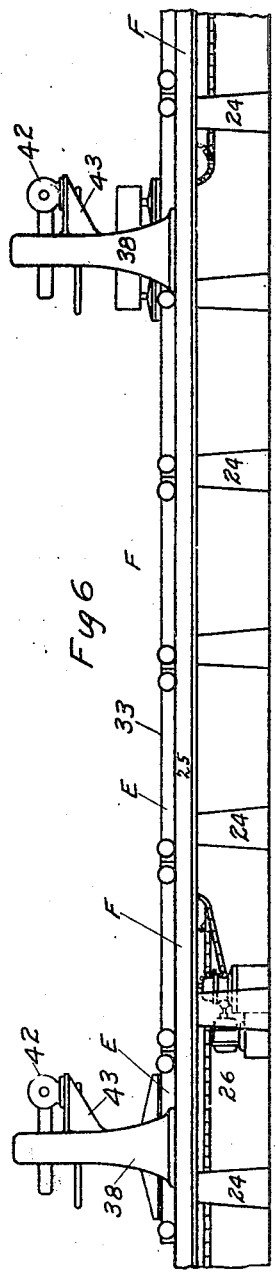
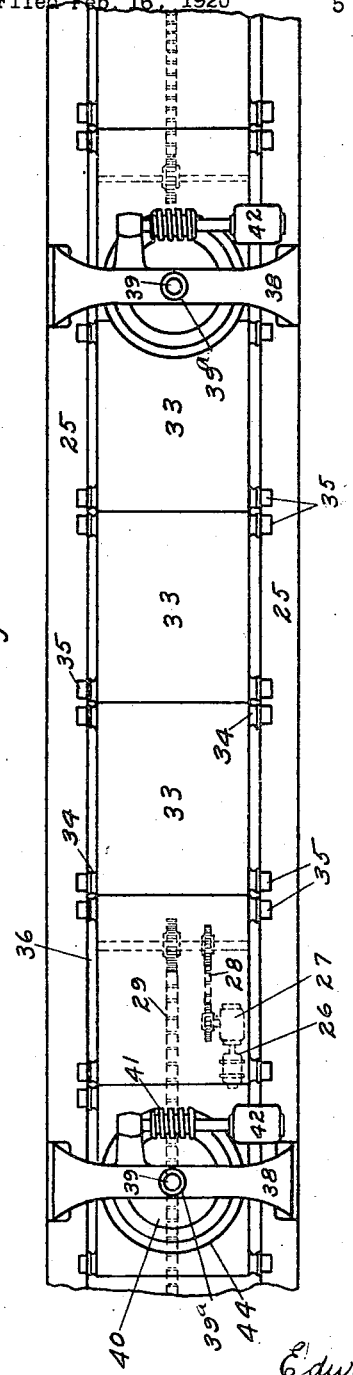
Inventor
Edward T. Brown.
By J. H. Harness
Attorney

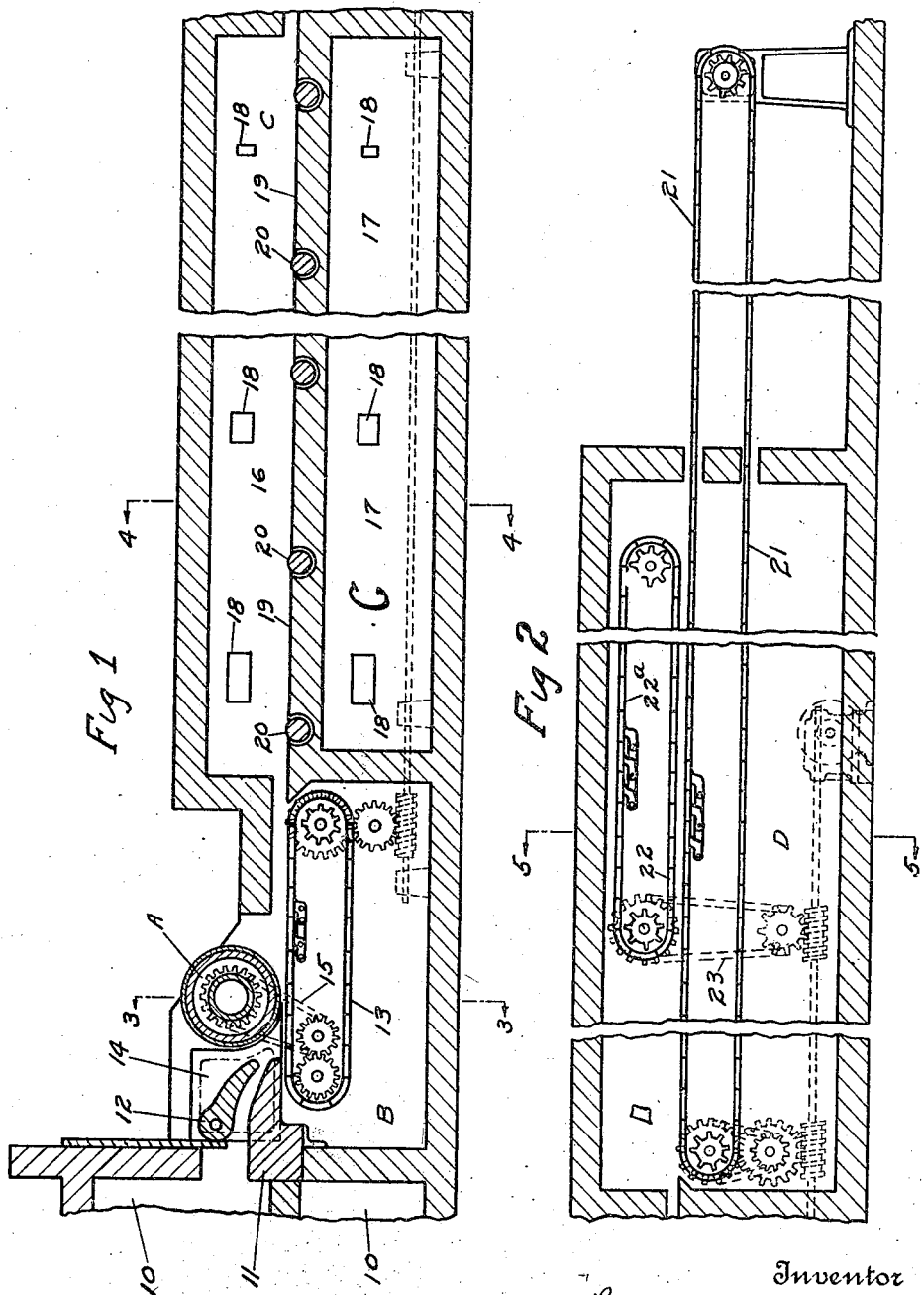

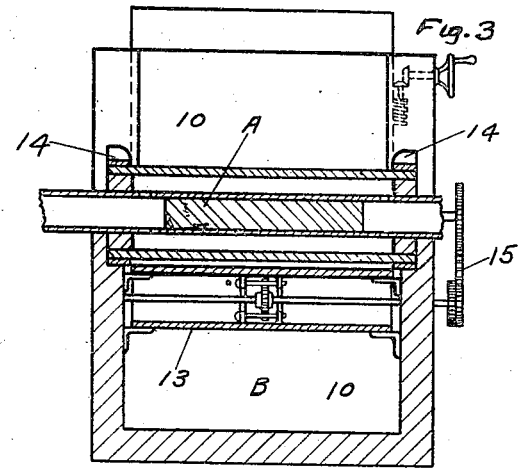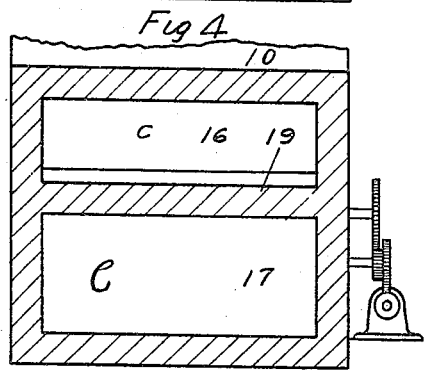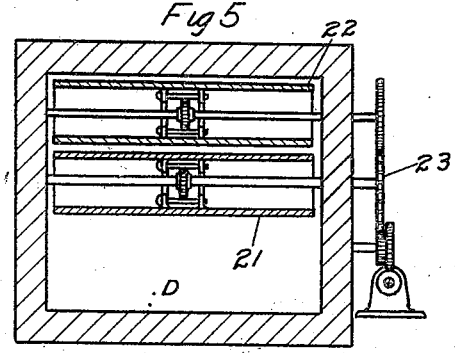

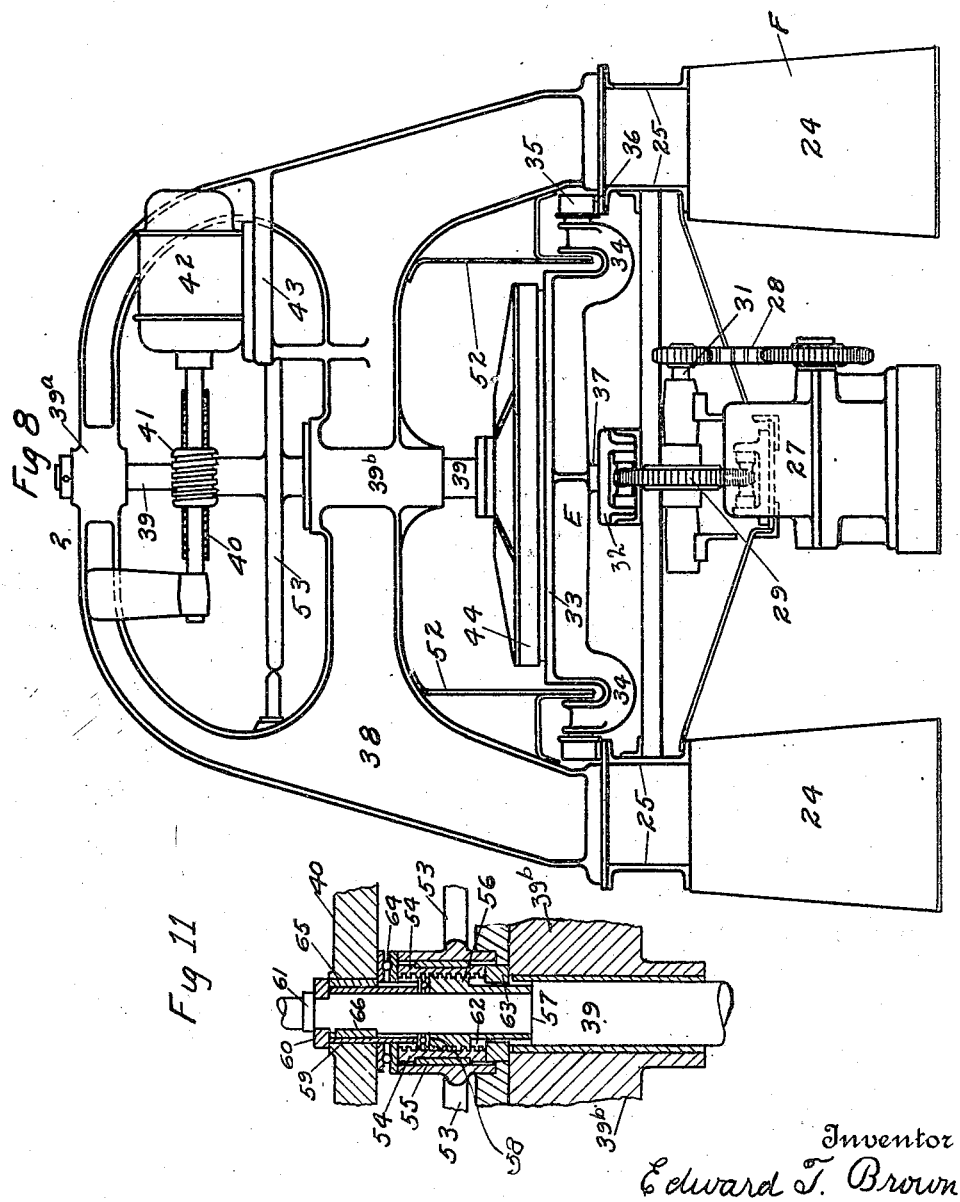

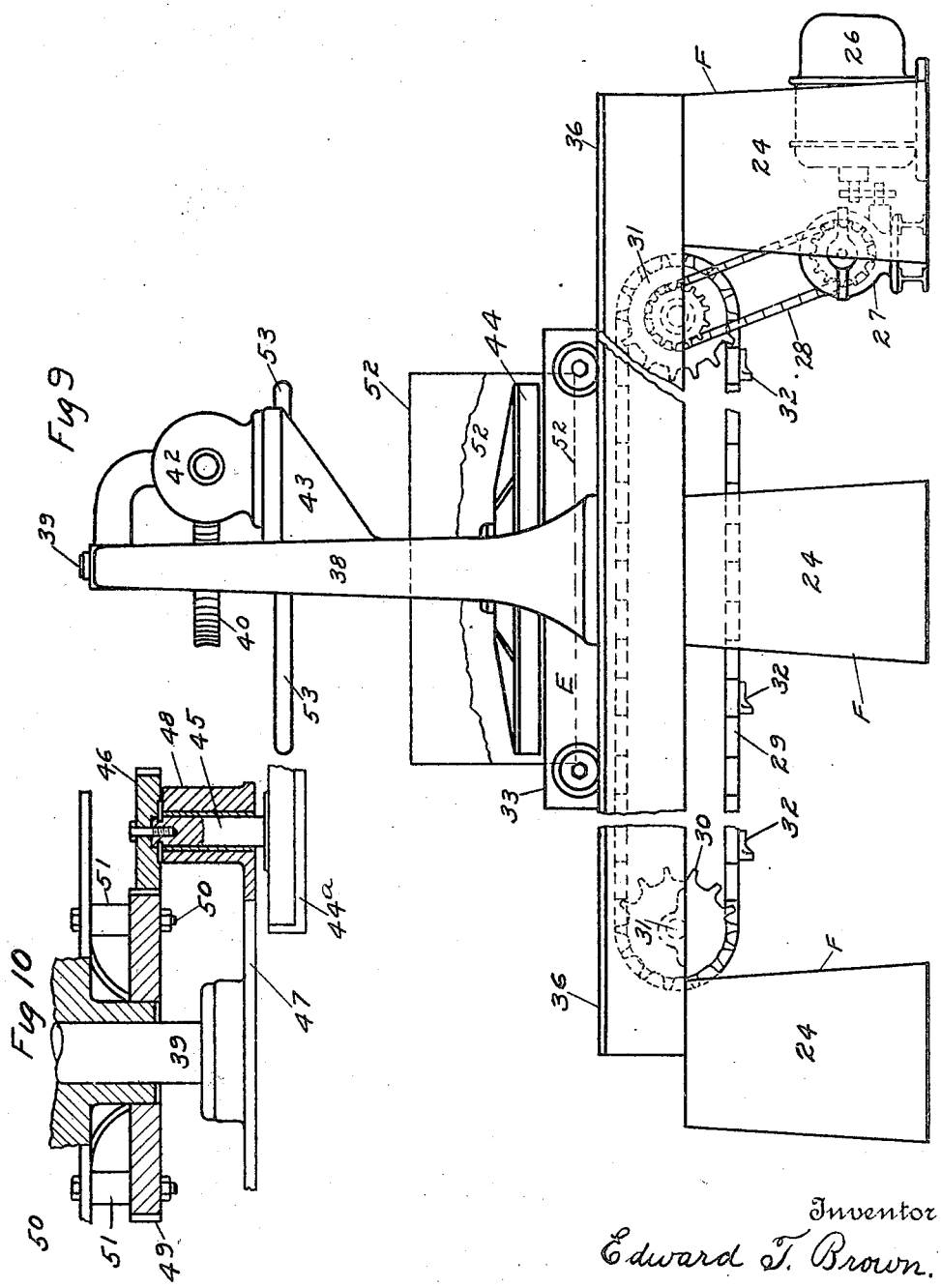

Patented Nov. 27, 1928.

1,692,813

UNITED STATES PATENT OFFICE.

EDWARD T. BROWN, OF DETROIT, MICHIGAN, ASSIGNOR TO FORD MOTOR COMPANY, OF DETROIT, MICHIGAN, A CORPORATION OF MICHIGAN.

MANUFACTURE OF GLASS.

Application filed February 16, 1920. Serial No. 358,979

The object of my invention is to provide new and useful glass method and machinery for glass manufacture of simple, durable and inexpensive construction.

A further object of my invention is to provide means whereby the process of manufacturing may be continuously pursued, comprising a tank wherein the glass may be mixed and reduced to a molten state, means for drawing the molten glass from the tank, means for sizing the stream of glass so drawn, means for annealing and cooling the sized strip of glass, and arranged successively thereafter the various devices for cutting the strip into pieces and for grinding and finishing both sides of the pieces.

With these and other objects in view, my invention consists in the arrangement, combination, and construction of the various parts of my improved device, as described in the specification, claimed in my claims, and shown in the accompanying drawings, in which:

Figure 1 is a vertical, central, sectional view illustrating one form of tank, spout, sizing device and annealing chamber or leer.

Figure 2 is a continuation thereof showing the device which draws the glass through the leer, permits further cooling of the glass and conducts the glass to position where the continuous strip may be cut into pieces.

Figure 3 is a vertical, sectional view taken on the line 3—3 of Figure 1.

Figure 4 is a similar view taken on the line 4—4 of Figure 1.

Figure 5 is a similar view taken on the line 5—5 of Figure 2.

Figure 6 is a continuation of Figure 2 showing a side elevation of the conveyor and platform which carries the cut pieces of glass beneath the grinding and smoothing devices.

Figure 7 is a top or plan view of the device shown in Figure 6.

Figure 8 is an end elevation of one of my improved grinding and smoothing devices.

Figure 9 is a side elevation of the device shown in Figure 8.

Figure 10 is an enlarged, detailed view, parts being shown in section, which illustrates the construction of one form of my smoothing device.

Figure 11 is an enlarged, central, vertical section, detailed, of a portion of my improved grinding and smoothing device, and Referring to the accompanying drawings, I have used the reference numeral 10 to indicate generally the discharge end of a tank for mixing and melting the constituents of glass, whereby the molten glass may be drawn from said discharge end. Such a tank is of well known construction and forms no part of my invention, except as it performs the function of furnishing molten glass in proper condition for the practice of my invention. At the discharge end 10 of this tank a spout device comprising lower member, or slab 11, is disposed in such position that the molten glass may continuously run from the tank over the slab and be discharged therefrom. A movable top member 12 is provided for the slab 11 and the parts are so arranged that the slab 11 and top member 12 form a spout which may be adjusted to discharge a stream of molten glass of a predetermined thickness.

Adjacent to the slab 11 and below it is a conveyor 13 which is adapted to receive the stream of molten glass from the spout formed by the slab 11 and top member 12, and to convey this stream of glass to position adjacent to a sizing roller designated generally by the reference letter "A". The roller "A" is arranged on a horizontal axis parallel with the axes of the conveyor 13 and above it so that the molten glass carried by the conveyor 13 must travel under this roller, whereby the layer of glass will be reduced to a predetermined thickness. Means are provided for adjusting the roller "A" vertically to vary the thickness of the layer of glass permitted to pass through the pass formed between the conveyor 13 and roller A. The roller is formed in such manner as to permit cooling of its interior.

At the other end of the spout device is a retaining member 14 at each side of the device and which extends from the side of the spout forwardly to a position where its forward edge is contiguous to the periphery of the roller "A". It will thus be seen that the members 14 form side walls to control the width of the stream of molten glass from the spout, thereby insuring that the stream of glass passing beneath the roller "A" will be of a uniform width which will be determined by the position of the retaining members 14.

In this connection it may be mentioned that the roller "A" is driven by a chain indicated by the dotted lines 15, which in turn is driven by the shaft operably connected with the conveyor 13, to cause the periphery of the roller "A" to travel at the same speed as the surface of the conveyor 13.

Means may also be provided for heating the roller "A" to such a temperature that it will properly co-act with the molten glass to reduce it to the thickness desired. The roller may also be so arranged that it travels at a somewhat less speed than the surface of the conveyor 13 to thereby stretch the glass passing therebeneath.

The glass passing beneath roller "A" will still be in a somewhat molten condition, although the temperature will be very considerably less than that at which it was discharged from the tank 10. The conveyor 13 carries this glass in the condition mentioned through a chamber designated generally by the reference letter "B" and discharges it onto the slab in the leer "C". The leer which is used in connection with my improved method of manufacturing glass comprises upper and lower chambers 16 and 17, into which heat from any suitable source is directed through the openings 18, but it will be understood that the leer "C" may be one chamber and that the slab which I have designated by the reference numeral 19 may be supported in the one chamber if so desired in any suitable manner. The openings 18 and the burners adjacent thereto are so arranged that the left hand end of the leer, as shown in Figure 1, is heated to a much greater temperature than is the right hand end, and the temperature between these two points is graduated by the number of burners or position or size of the openings 18. It will be understood that this graduation of the heat from the receiving to the discharge end of the leer allows substantially molten glass, which is received at the receiving end of the slab 19, to be gradually cooled or annealed, thereby eliminating the strains in the glass which would possibly cause it to be unduly brittle or irregular in texture.

A plurality of rollers 20 may be arranged in the surface of the slab 19 and so disposed that their upper surfaces are substantially flush with the upper surface of the slab so that said rollers may lessen the energy required to pull the glass over the slab while at the same time they will not tend to bend or wave the glass.

Following the leer "C" is an unheated chamber, designated generally by the reference letter "D". In the chamber "D" is one end of a conveyor 21 which receives the congealed glass from the leer "C", carries it through the chamber "D" and extends out to position spaced from the end of the chamber "D". Disposed above the conveyor 21 in such position that the parts thereof may contact with the glass on the conveyor 21 is a second conveyor 22. The conveyor 22 is arranged to be driven by a chain 23, which is connected with the driving mechanism which moves the conveyor 21 and travels at the same speed as the conveyor 21. The purpose of the conveyor 22 is to grip the strip of glass on the conveyor 21 between the two conveyors, thereby drawing the strip of glass through the leer "C" and over the slab 19. The conveyor 22 may be arranged in any suitable way to accomplish this gripping, but I preferably form it of weighted links 22$^a$, which will rest upon the glass strip, thereby causing sufficient frictional engagement between the links 22$^a$ of the conveyor 22 and the strip of glass so that the rotation of the conveyors 21 and 22 will draw the strip of glass through the leer.

In this connection it may be mentioned that the tension due to the drawing conveyor 22 has the effect of tending to straighten out the glass in the leer during the annealing process, thereby preventing waves in the glass and also placing the entire strip under an even tension, which tends to secure a uniform consistency of the glass.

After the glass leaves the chamber "D" it is sufficiently cooled so that it may be exposed to the open air and the conveyor 21 is extended to such a length that the glass at or adjacent to the outside end thereof may be cut into pieces and trimmed. I have not here shown mechanism for accomplishing this result, as the cutting and trimming may be accomplished either by hand or by other suitable machinery.

When the glass has been cut into pieces, as described, it is set in plaster upon the top of a cart or carrier, designated generally by the reference letter "E". It will be understood that the purpose of setting the glass on the plaster is so that its upper surface may be ground and that the weight of the grinders on the glass may not shatter it due to irregularities in the lower surface of the glass. After the glass is set as described, each piece being set upon one cart or carrier "E", these carriers are placed on a conveying platform, designated generally by the reference letter "F", end to end and carried along the platform "F" beneath rough grinding devices and smooth grinding devices. Enough of the rough grinding devices and smooth grinding devices are provided in conjunction with the conveyor "F" so that the glass on each cart or carrier "E", as it passes along the conveyor, may be both smoothed and finished ready for the polishing devices. I may also provide polishing devices in conjunction with the rough and smooth grinders so that the piece of glass need not be removed from the carrier "E" until one side of the glass has been ground and polished.

As soon as the glass has been ground, or ground and polished, upon one side, the plaster in which it is set is softened in any suitable manner and the glass is then turned over on the same cart, again set in plaster and then started along a second conveyor "F", which is not here illustrated as the construction thereof is similar in all respects to the conveyor "F" here illustrated. I preferably provide suitable transfer means between the end of the conveyor "F" which grinds the first side of the glass and the start of the conveyor "F" which does the grinding of the second side of the glass, and in conjunction with such transfer means preferably provide such mechanical aids as may be desirable to assist in the turning over of the glass and the resetting thereof.

In connection with the grinding devices heretofore mentioned I have illustrated two forms thereof in Figures 8 to 10, and the construction thereof will now be more particularly described, together with the construction of the conveyors "F". The conveyors "F" comprise a plurality of spaced supporting legs 24 which in turn support longitudinal frame members 25. Between the legs 24 is disposed a motor 26, which is connected through a worm gearing 27 and chain 28 to a conveyor 29 mounted on sprockets 30, which are fixed to shafts 31, which are suitably supported in position below and between the frame members 25. The conveyor 29 comprises a chain having at intervals a plurality of outwardly extending lugs 32, which are spaced apart a distance substantially equal to the length or a fraction of the length of the carriers "E". The carriers "E" comprise a platform 33, having at its four corners laterally extending curved arms 34, which are designed to form supports for rollers 35. The rollers 35 are flanged and run on a track 36, secured to the upper, inner edge of the frame members 25. A lug or arm 37 projects downwardly from the platform 33 and is designed to co-act with the lugs 32 so that movement of the conveyor will impart a corresponding longitudinal movement to the carts or carriers "E" along the conveyor "F". It will thus be seen that the conveyor 29, together with the carts or carriers "E", form means for moving the pieces of cut and hardened glass continuously along the conveyor "F", where they may come in contact with the grinding devices successively to smooth out irregularities in the surface of the glass. These grinding devices comprise yokes 38, which are mounted on the frame members 25, and extend across the conveyors "F" in position spaced above the path of travel of carriers "E".

These yokes carry a central, vertical shaft 39, which is driven by the worm wheel 40, which in turn connects with a worm 41, driven by a motor 42 mounted on a suitable bracket 43 secured to the yoke 38. A comparatively large and heavy bearing 39$^b$ is provided in the central portion or web of the yoke 38 and a somewhat lighter bearing 39$^a$ is provided at the upper web of the yoke. A large wheel 53 is secured to the shaft 39 above the bearing 39$^b$ and acts as a retaining member to govern the relative vertical position of the shaft 39, if so desired. At the lower end of the shaft 39 is a grinding device which may be either of the form illustrated in Figures 8 and 9, or of the form illustrated in Figure 10. In either case the grinding is performed by rotating a cast iron disk 44, which is connected with the shaft 39 in such position that the lower surface of the disk 44 contacts with the upper surface of the glass on the carrier "E", so that when sand and water are introduced between the glass and the disk, then the rotation of the disk causes an abrading of the surface of the glass to thereby remove the irregularities thereof.

I have found it desirable to make the grinding disk vertically adjustable and have illustrated one form of device for accomplishing that result in Figure 11. In this form of device the large wheel 53 has a sleeve 54 keyed to the inner surface of the hub at 55. The interior of the sleeve 54 is threaded to co-act with a similarly threaded sleeve 56, which is rotatably mounted on the shaft 39. The shaft 39 is provided with a shoulder 57 below the sleeve 56 which co-acts therewith to hold the sleeve in place. Above the sleeve 56 is a thrust bearing 58 which in turn supports a sleeve 59, which in turn supports a split ring 60, which is fixed to the shaft 39 below an annular flange 61 thereon. From the construction of the parts just described it will be seen that rotation of the wheel 53 will impart rotation to the sleeve 54, which in turn co-acts with the sleeve 56, which will cause the sleeve 56 to raise or lower, depending upon the direction of rotation of the wheel 53. The sleeve 56 is held from rotation within the bearing 39$^b$ by means of a key-way 62, which, however, permits the sleeve to reciprocate vertically. Vertical reciprocation of the sleeve 56 moves the shaft 39 downwardly or upwardly, due to the shoulder 57 or due to the sleeve 59 and collar 60. The hub of the wheel 53 is counter-sunk into a collar 63 mounted above the bearing 39$^b$ and above the hub is a thrust bearing 64 upon which the worm gear 40 rests. The worm gear 40 is slidably keyed to the collar 59 at 65 and the collar 59 is in turn slidably keyed to the shaft 39 at 66. It will therefore be seen that vertical reciprocation of the shaft 39 and sleeve 59 will not affect the vertical position of the worm wheel 40 when the shaft 39 is adjusted vertically.

In the form of device illustrated in Figures 8 and 9 the disk 44 consists of a single, large disk of slightly greater diameter than the width of the piece of glass to be ground. In the form of device illustrated in Figure 10 a plurality of smaller disks are driven by means of a planetary transmission, which will now be described. These disks 44$^a$ are each secured to a shaft 45, which has at its upper end a gear wheel 46. A plate or disk 47 is secured to the lower end of the shaft 39 and has a plurality of spaced, vertical bearings 48 disposed at intervals around near its outer edge. The shaft 45 is received in the bearing 48 so that rotation of the shaft 39 imparts rotation to the disk 47 and in turn carries shafts 45 and disks 44 around through a circular path. A large ring gear 49 is secured to the transverse web of the yoke 38 adjacent to the bearing 41 by means of bolts 50 and collars 51. The collars 51 act as spacing sleeves to position the ring gear 49 in horizontal alignment with the gear wheels 46. Due to the mounting of the ring gear 49 it will be seen rotation or travel of the disks 44 in a circular path will cause the engagement of the gear wheels 46 with the ring gear 49 to rotate the disks 44 during their circular travel.

In this form of the device sand and water are introduced between the grinding disks 44ª and the glass in the same way in which it is used where a single, large disk 44 is used.

I do not desire to limit myself to cast iron grinding disks in combination with sand and water for grinding, but may find it desirable to use disks of abrasive material.

Adjacent to each of the yokes 38 I provide a shield 52 which is secured to the yoke 38, and adapted to prevent the throwing of sand and water from the grinding disk during the rotation of the latter. In this connection it may also be mentioned that I have found the large, single disks desirable to use for the rough grinding of the glass and the plurality of smaller disks driven by the planetary transmission more desirable for the finish or smooth grinding. I have also used a universal connection between disks 44 and stub shafts 45 with considerable success.

In the practical operation of my improved device it will be seen that glass is flowed through the adjustable spout comprising the slab 11 and top member 12, between the retaining members 14 onto the conveyor 13. Then between conveyor 13 and roller "A", whereby the molten glass is reduced to a predetermined width and thickness. This molten glass is then carried by the further movement of the conveyor to position where it has hardened somewhat so that it may be delivered to the slab 19 of the leer. It is pulled through the leer by the drawing conveyors 21 and 22, carried through the unheated chamber "D" until sufficiently cooled to be exposed to the atmosphere and then carried on the conveyor 21 a distance sufficient so that the strip of glass may be trimmed and cut to pieces of a desired size. These pieces are then taken off the conveyor 21 when cut and slid onto the moist plaster on a carrier "E", then the carrier "E" is rolled onto the tracks 36 of the conveyors "F". The conveyor "F" may be a continuation of the conveyor 21, and it will be understood that I may use the endless type of conveyor and provide an automatic plaster mixer, so that the pieces of glass may be slid from the conveyor 21 to the conveyor "F" without stopping its progress. It will thus be seen that the process of the manufacture of the glass, including the grinding, may be a continuous process, provided the proper number of workmen are provided for mounting the pieces of glass on the carriers "E". After the one side of the glass has been ground, then it is loosened from the carrier, turned over, and remounted in plaster. There again the process of turning the glass may be speeded up by providing a sufficient number of workmen and carriers so that it may be kept equal with the production of the glass from the conveyor 21. The grinding process, either on the first side or second side, may be carried on as rapidly as the conveyor 21 may turn out the pieces of glass by increasing the number of grinding devices used or operated on the two conveyors or conveyor frames "F". It may, therefore, be said that by my improved method and machinery for making glass I have devised a system whereby glass in plates may be turned out as rapidly at the end of the grinding process as the glass may be formed by the forming roller "A".

While the general arrangement disclosed herein presents characteristics of two general structural departments—the sheet-forming and the plate glass finishing departments—it will be understood that there is a direct co-operation between these such as to set up the conditions of a unitary condition. This will be understood from the following:

The product to be secured is that of the transparent plate glass such as is found in commercial use generally, a product in which the refraction conditions are as uniform as possible, and in which the plate is of thickness considerably in excess of that of window glass. These conditions have led to the production of a sheet by the casting process having a thickness in excess of that of the finished plate, so as to enable the treatment of the opposite faces to produce the transparency of the plate. This is the universal process in the production of plate glass commercially for many years and is the general practice at the present time. In this practice the sheets or plates which produce the final product are treated practically individually, in that the specific characteristics of each is considered in connection with the grinding and polishing activities, due to the fact that in the casting processes there is no certainty in the uniformity of the embryo sheets such as would permit of grinding and polishing operations based on a general standard such as would permit a succession of sheets to be subjected to precisely the same treatment.

To permit of operations on a production basis—excepting under conditions which simply involve duplication of the instrumentalities used with an increased plant—it becomes essential to produce the grinding and polishing activities on the basis of a standard common to a multiplicity of embryo plates so that these can be treated successively and in a rapid succession, and to permit this result to be obtained it is essential that the embryo plates have uniform thickness dimensions in order that the grinding and polishing instrumentalities need not be adjusted to meet the condition of individual plates.

In the present invention this result is obtained by first fashioning a continuous sheet of uniform texture and dimensions as to thickness, cutting the sheet into the embryo plates, and then successively passing these plates through the zones of activity of the grinding and polishing instrumentalities to first rough grind, then smooth, and finally polish the faces of the plates. In producing this result the desired characteristics are produced by a stage development. This will be briefly referred to.

The supply of molten metal to permit continuous sheet production is the melting tank of large dimensions. The metal is delivered from the tank over a spout on to the upper face of an endless-conveyor with the receiving face travelling continuously in a horizontal plane. The lip of the spout is spaced a distance above the conveyor, and the metal, in passing from the spout, "falls" on to the conveyor—there is no support to the stream content during this time nor is there any shaping or sizing activity during this period. In fact, the "falling" stream content is moving in a direction at substantial right angles to the direction of movement of the conveyor face, with the result that the abrupt change in direction of movement of the stream content and the distance of "falling" practically prevents any attempt to maintain the actual texture conditions found in the falling stream and breaks down any ability to size the sheet during this period.

As a result, the texture of the sheet is practically completed during the movement of the conveyor face from the point where the stream reaches it to the sizing or dimensioning pass. Because of this the texture formation is actually produced while the metal is in the plane of the pass, and the flow characteristic which may be present is permitted freedom of action so that strains, etc., are prevented. This freedom to compensate during the forming period ends when the metal passes through the dimensioning pass, the result being that the sheet thus formed in the pass is of a generally uniform texture; and when the sheet continues its travel through the leer, the annealing and tempering activity is upon a sheet formation that has this generally uniform texture characteristic.

It will be understood, of course, that when this sheet is cut into the sections having the dimensions of the plates to be ground and polished, each section will have the same general texture characteristics as well as the same thickness dimensions. Because of this condition, it is equally obvious that any cycle of grinding and polishing activity which may be employed with one plate becomes applicable for a succession of plates, due to the similarity between plates in these particular characteristics. It is thus possible to set up a general cycle and standard within the grinding and polishing branch of the plant. Because of this it is possible to set up the conditions of a rough grinding zone, for instance, in which a succession of individual units act progressively on a plate which is moving through a path of travel relative to the succession of units.

It will be readily understood, therefore, that the use of a grinding and polishing assemblage of instrumentalities capable of producing large production capacity with a minimum of instrumentalities necessitates the continued activity of the units in order to permit operation at a minimum cost of operation, and that it is necessary that the supply of the glass sections be adequate to maintain the activity. Because of the necessity for uniformity in texture and thickness of the embryo plates to produce this result, the character of the plant for producing the embryo plates becomes of vital importance. Hence, there is a direct co-operation between the two branches of the present invention, the plate-production branch being essential to the finishing branch in order to permit of the production of embryo plates capable of supplying the finishing branch.

The advantages of such a continuous system of turning out glass will be obvious, both because of the low overhead expense involved therein due to the continuous use of all the machinery, and because of the improved quality of the glass due to its continuous production under like conditions. In this connection it may be mentioned that the quality of glass depends upon so many different elements that it is almost impossible to secure glass of uniform quality because so many conditions must be made uniform under ordinary circumstances. With my improved method, however, it will be seen that the apparatus used will require but very slight attention to keep all the conditions of manufacture uniform throughout the time that the devices are being operated, so that the glass turned out will be uniformly of good quality.

Some changes may be made in the arrangement and construction of the various parts of my improved device without departing from the spirit of the invention therein and it is my intention to cover by my claims such changes as may be reasonably included within the scope thereof.

I claim as my invention:

1. The method of manufacturing plate glass continuously consisting of allowing the molten glass to flow from the melting tank through a spout of substantially the width of the glass desired onto a moving conveyor, thence between the conveyor and a roller to reduce the glass to a predetermined thickness, thence through a leer to temper and harden the glass, thence between pulling devices which draw the glass through and out of the leer.

2. The method of manufacturing plate glass consisting of flowing molten glass from a spout in a melting tank onto a conveyor, thence horizontally through a pass to reduce the glass to a predetermined thickness and width, drawing the glass through a leer to anneal and harden it by devices disposed beyond the heated portion of the leer to maintain the sheet free from waves, then conducting it to position where it may be cut into pieces of predetermined size.

3. The method of manufacturing plate glass consisting of flowing molten glass from a spout in a melting tank onto a conveyor, thence horizontally through a pass to reduce the glass to a predetermined thickness and width, drawing the glass through a leer to anneal and harden it by devices disposed beyond the heated portion of the leer to maintain the sheet free from waves, then conducting it to position where it may be cut into pieces of predetermined size, which may be arranged end to end and conducted beneath grinding devices.

4. The method of manufacturing plate glass consisting of flowing molten glass from a spout in a melting tank onto a conveyor, thence horizontally through a pass to reduce the glass to a predetermined thickness and width, drawing the glass through a leer to anneal and harden it by devices disposed beyond the heated portion thereof, then delivering the glass in its continuous sheet form to a station external of the leer to permit the sheet to be cut into pieces of predetermined size, which may be arranged end to end and conducted beneath grinding devices, the first of the grinding devices of varied abrasive texture.

5. In the art of producing continuous sheet glass, the method of forming the sheet which consists in flowing the molten metal continually from a spout in stream form on to a plane surface moving continuously in a horizontal plane with the point of stream discharge from the spout spaced above such surface to permit the stream to "fall" downwardly from the spout in a vertical direction on to such plane surface to limit sheet dimensioning activities on the stream content to be produced wholly upon such plane surface, and advancing the stream content from the point of its reception on such surface to and through a dimensioning pass by the advancing movement of the surface, such surface forming the bottom of the dimensioning pass.

6. The method of manufacturing plate glass continuously consisting of flowing the molten glass through a spout adapted to limit the flow to a predetermined thickness and width, then receiving the molten glass from this spout on a conveyor, then determining the thickness of the glass by forcing it between a roll and the conveyor, then discharging it from the conveyor onto the slab of a leer, then drawing the glass across the slab in the leer into an unheated chamber, then discharging it from the unheated chamber and conveying it on the same conveyor a distance sufficient to allow the glass to cool so that it may be trimmed and cut into pieces.

7. The method of manufacturing plate glass continuously consisting of flowing the molten glass through a spout adapted to limit the flow to a predetermined thickness and width, then receiving the molten glass from this spout on a conveyor, then determining the thickness of the glass by forcing it between a roll and the conveyor, then discharging it from the conveyor onto the slab of a leer, and drawing the glass across the slab, the leer comprising a heated chamber above and below the slab in which the heat at the receiving end is greater than the heat at the discharging end and the temperatures at intermediate points are graduated from the first described to the second described end.

8. The method of manufacturing plate glass continuously consisting of flowing the molten glass through a spout adapted to limit the flow to a predetermined thickness and width, then receiving the molten glass from this spout on a conveyor, then determining the thickness of the glass by forcing it between a roll and the conveyor, then discharging it from the conveyor onto the slab of a leer, then drawing the glass across the slab in a leer into an unheated chamber, said unheated chamber being of such length that the glass discharged from the discharge end thereof will not be injured by its contact with the open air.

9. The method of manufacturing plate glass continuously consisting of flowing the molten glass through a spout adapted to limit the flow to a predetermined thickness and width, then receiving the molten glass from this spout on a conveyor, then determining the thickness of the glass by forcing it between a roll and the conveyor, then discharging it from the conveyor onto the slab of a leer, the leer comprising a heated chamber above and below the slab in which the heat at the receiving end is greater than the heat at the discharge end and the temperature at intermediate points are graduated from the first described to the second described end, then drawing the glass across the slab in the leer into an unheated chamber, said unheated chamber being of such length that the glass discharged from the discharge end thereof will not be injured by its contact with the open air, then discharging it from the unheated chamber and conveying it on the same conveyor a distance sufficient to allow the glass to cool so that it may be trimmed and cut into pieces.

10. A method as in claim 5 characterized in that the dimensioned sheet is annealed and tempered by continuing the advancing movement of the sheet to lead it into and through a leer.

11. The method of manufacturing glass continuously by flowing molten glass from a tank thereof between retaining members spaced a predetermined distance apart, onto a conveyor and thence beneath an adjustable gate device to reduce the stream to a predetermined thickness, thence through a leer to anneal and harden the stream, thence between pulling devices to draw the glass through and out of the leer and maintain it free from waves.

12. The method of manufacturing plate glass continuously consisting of flowing molten glass through a spout from a tank of molten glass onto a moving conveyor, thence between the conveyor and a roller operated at a speed not exceeding that of the conveyor to reduce the glass to a predetermined thickness, thence through a leer to temper and harden the glass, and thence between pulling devices to draw the glass through and out of the leer and maintain it free from waves.

13. The method of manufacturing plate glass continuously consisting of flowing molten glass through a spout from a tank of molten glass onto a moving conveyor, thence between the conveyor and a roller operated at a speed not exceeding that of the conveyor to reduce the glass to a predetermined thickness, thence through a leer to temper and harden the glass, and thence between pulling devices to draw the glass through and out of the leer and maintain it free from waves, the leer being so arranged that the heat therein gradually decreases from the receiving to the discharge end.

14. Means for forming plate glass continuously consisting of means for flowing the molten glass continuously from a tank in a stream of predetermined size onto a moving conveyor, a leer having a stationary slab extended therethrough disposed at the end of the conveyor and adapted to receive the thickened glass on said slab, a moving conveyor at the second end of the slab adapted to receive the congealed strip of glass therefrom and means co-acting with the second conveyor or adapted to cause said conveyor to draw the strip of glass over the slab in the leer.

15. Means for forming plate glass continuously consisting of means for flowing the molten glass continuously from a tank in a stream of predetermined size onto a moving conveyor, a leer having a stationary slab extended therethrough disposed at the end of the conveyor and adapted to receive the thickened glass on said slab, said leer being arranged so that the heat therein decreases gradually from the receiving to the discharge end thereof, a moving conveyor at the second end of the slab adapted to receive the congealed strip of glass therefrom and means co-acting with the second conveyor adapted to cause said conveyor to draw the strip of glass over the slab in the leer.

16. Means for forming plate glass continuously consisting of means for flowing the molten glass continuously from a tank in a stream of predetermined size onto a moving conveyor, a leer having a stationary slab extended therethrough disposed at the end of the conveyor and adapted to receive the thickened glass on said slab, said leer being arranged so that the heat therein decreases gradually from the receiving to the discharge end thereof, and the slab having a plurality of spaced parallel transverse rollers arranged with their upper surfaces substantially flush with the upper surface of the slab, a moving conveyor at the second end of the slab adapted to receive the congealed strip of glass therefrom and means co-acting with the second conveyor adapted to cause said conveyor to draw the strip of glass over the slab in the leer.

17. Means for forming plate glass continuously consisting of means for flowing the molten glass continuously from a tank in a stream of predetermined size onto a moving conveyor, a leer having a stationary slab extended therethrough disposed at the end of the conveyor and adapted to receive the thickened glass on said slab, the slab having a plurality of spaced parallel transverse rollers arranged with their upper surfaces substantially flush with the upper surface of the slab, a moving conveyor at the second end of the slab adapted to receive the congealed strip of glass therefrom and means co-acting with the second conveyor adapted to cause said conveyor to draw the strip of glass over the slab in the leer.

18. Means for forming plate glass continuously consisting of means for flowing the molten glass continuously from a tank in a stream of predetermined size onto a moving conveyor, a leer having a stationary slab extended therethrough disposed at the end of the conveyor and adapted to receive the thickened glass on said slab, a moving conveyor at the second end of the slab adapted to receive the congealed strip of glass therefrom and a third conveyor disposed above the second conveyor and adapted to co-act therewith to grip the glass and draw it through the leer.

19. Means for forming plate glass in a continuous strip comprising a tank of molten glass, means for flowing a stream of a predetermined width and thickness onto a moving conveyor, a leer having a stationary slab extended from one end to the other thereof, means for applying heat to either side of the slab, the slab being arranged to receive the thickened glass from the discharge end of the conveyor, an unheated chamber disposed at the discharge end of the leer, a moving conveyor having one end extended through the last described chamber to position to receive the glass from the slab, the other end of the second conveyor being extended a distance from the chamber sufficient to allow the glass to cool to a temperature so that it may be handled, and means adapted to co-act with said second conveyor within said chamber to draw the glass along said slab.

20. A method as in claim 5 characterized in that the dimensioned sheet is annealed and tempered by continuing the advancing movement of the sheet to lead it into and through a leer while maintaining the sheet in a constant horizontal plane throughout its advancing movement.

21. In the art of producing plate glass by a continuous process, wherein the glass is first formed in sheet form of greater thickness than the finished plate and then ground and polished to the desired thickness, the method of producing the sheet for the embryo plates, said method consisting in producing a continuous sheet by flowing the molten metal continuously from a melting tank to and over a spout positioned over and in spaced relation to a plane surface movable continuously in a horizontal plane and with the metal flowing from the spout in stream form and the plane surface receiving the metal in such stream form, the conditions being such that the metal "falls" from the spout in a direction at substantial right angles to the direction of movement of the surface which receives it, whereby the stream characteristic of the falling metal is changed by its contact with said surface and the sheet dimensioning activity on the stream content is substantially restricted to the period in which the stream content is present on such surface, moving the "fallen" stream content by movements of such plane surface to carry the content to and through a dimensioning pass of which the surface forms the bottom wall to produce a continuous sheet of the desired dimensions, and annealing and tempering the sheet by continuing its travel to and through a leer.

22. A method as in claim 21 characterized in that the plane of movement of the bottom of the sheet into and through the leer is coincident with the plane of the moving surface which receives the falling stream content.

23. A method as in claim 21 characterized in that the continuous annealed and tempered sheet is air-cooled at the exit end of the leer and is cut to the grinding and polishing dimensions during such air-cooling period, whereby the stream content is maintained in constant movement from its exit from the tank to its completion ready for the grinding and polishing activities.

24. A method as in claim 21 characterized in that the continuous annealed and tempered sheet is air-cooled at the exit end of the leer and is cut to the grinding and polishing dimensions during such air-cooling period, the plane of movement of the bottom of the sheet into and through the leer and through the air-cooling zone being coincident with the plane of the moving surface which receives the falling stream content.

EDWARD T. BROWN.